United States Patent Office 3,832,208
Patented Aug. 27, 1974

3,832,208
NACREOUS PIGMENTS TREATED WITH METHACRYLATOCHROMIC CHLORIDE FOR IMPROVED HUMIDITY RESISTANCE
Julius Jackson, Westfield, N.J., assignor to E. I. du Pont de Nemours and Company, Wilmington, Del.
No Drawing. Application Mar. 9, 1972, Ser. No. 233,287, which is a continuation-in-part of abandoned application Ser. No. 129,565, Mar. 30, 1971. Divided and this application May 22, 1973, Ser. No. 362,738
Int. Cl. C09c 1/36
U.S. Cl. 106—308 Q                4 Claims

ABSTRACT OF THE DISCLOSURE

Titania-coated micaceous pigments are treated with methacrylatochromic chloride. Coating compositions containing such treated pigment provide improved resistance to weathering, particularly high humidity conditions.

CROSS REFERENCE TO RELATED APPLICATIONS

This application is a division of application Ser. No. 233,287 filed Mar. 9, 1972, which in turn is a continuation-in-part of application Ser. No. 129,565 filed Mar. 30, 1971, and now abandoned.

BACKGROUND OF THE INVENTION

In the present day economy, one of the primary uses for both organic and inorganic pigments is in coating compositions intended for exposure to outdoor atmospheric conditions, e.g., automotive finishes. Although many types of commercially important pigments yield compositions that are resistant to changes in color and gloss when subjected to severe weathering conditions, other pigments tend to give compositions that are deficient in this respect. This is particularly true of the class of titania-coated micaceous pigments of type described in Linton U.S. Pat. 3,087,828. When a paint film undergoes loss of gloss upon exposure to high humidity conditions there is an undesirable whitening of the surface, generally called "humidity whitening." The deterioration of paint films in this way is a serious problem in industry, particularly with lacquer systems used as automotive finishes.

The cause of humidity whitening is believed to be wholly or in part due to water vapor penetrating the paint film. When this happens, micro-blisters are formed. The subsequent evaporation of water therefrom leaves holes in the film and these markedly increase light scattering, hence adversely affect color and gloss.

SUMMARY OF THE INVENTION

In accordance with the invention it has been found that titania-coated micaceous pigments can be provided with methacrylatochromic chloride absorbed on the surface thereof so that when incorporated into coating compositions the resultant paint films will have substantially improved resistance to humidity whitening. The amount of methacrylatochromic chloride absorbed on the surface of the pigment should be from about 0.05% to about 15%, preferably about 2% to about 6%, based on the pigment weight for effectively reducing the humidity whitening of paint films containing the surface treated pigment.

Methacrylatochromic chloride, a water soluble complex compound of the Werner type, is readily prepared by the method of Example 3 of Iler U.S. Pat. 2,524,803 in which a basic chromium chloride, dissolved in isopropanol, is reacted with methacrylic acid.

Titania-coated micaceous pigments which may be treated in accordance with the invention are described in Linton U.S. Pat. 3,087,828. These pearlescent so-called nacreous pigments are nonopaque flake like products in which $TiO_2$ particles of less than about 0.1 micron in diameter are deposited upon the mica substrate.

The mechanism responsible for the improved humidity whitening which is achieved with the surface treated pigments of the present invention is not fully understood. It appears to be necessary, however, that the methacrylatochromic chloride actually be absorbed on the surface of the pigment in order to give the improved effect. Thus no such improvement has been observed when the methacrylatochromic chloride is applied under such conditions that it is hydrolyzed during the application process, i.e., as would be the case if excessively high temperatures were employed during application from an aqueous medium. It is to be furthermore noted that the effect of the methacrylatochromic chloride is not solely a result of it being a Werner type complex since other Werner type complexes, for example the corresponding sterato chromic chloride has been found not to give such an improved humidity whitening in paint films.

The methacrylatochromic chloride is advantageously applied while the pigment is dispersed in an aqueous medium. Thus methacrylatochromic chloride, being water soluble, can be added to the dispersion for purposes of its absorption onto the pigment particles. In any case it is important that the temperature of the aqueous dispersion does not exceed about 60° C. or otherwise, it appears, excessive hydrolysis of the methacrylatochromic chloride occurs with the result that the desired improvement will not be satisfactorily achieved. Excessively high pH values, i.e., of 11 or greater, should likewise be avoided in order to maximize the nature of the improvement.

It has been found that the history of pigments prior to their treatment with the methacrylatochromic chloride may have some influence on the extent to which the treatment serves to improve humidity whitening. Thus particularly good results have been achieved when nacreous pigments have been initially subjected to the action of boiling water or boiling mineral acid solution. For example the initial boiling of the pigment may be effected in aqueous hydrochloric acid solution of pH 1.0 for 40 minutes. A treatment with sulfuric acid in the same manner is also effective but to a somewhat lesser degree. While the reasons for this further improvement are not fully known, it is noted that colloidal size pigment particles tend to be removed from the pigment by means of the initial boiling treatment.

The following examples, in which parts and percentages are by weight unless otherwise indicated, further illustrate the practice of the invention.

Example I

A. Fifty grams of a nacreous pigment composed of a mica substrate upon which has been deposited a thin layer of titanium dioxide (prepared by the general procedure of Example 1 of U.S. 3,087,828) is slurred in 850 cc. of water at a temperature of 27° C. The pH of the slurry is adjusted to 6.2 using dilute sulfuric acid. The treating agent used in this example is a 20% solution in isoproproponal of methacrylatochromic chloride. Then grams of the treating solution is slurried in 15 cc. of water, and added to the pigment slurry over a 20 minute period at a uniform rate to thus give 4% methacrylatochromic chloride based on the starting nacreous pigment. The pH of the pigment slurry is maintained between 5.9 and 6.1 during the addition by the use of aqueous 5% NaOH. Following addition of the methacrylatochromic chloride, the pigment slurry is stirred for one hour with the temperature being maintained at 27° C. Thereafter the pH, found to be 5.2, is readjusted to 5.9 to 6.1 using 5% NaOH. The slurry is filtered, washed with tap water until the resistivity is 600 ohm/cm., and the recovered product dried for 16 hours at 93° C. There is produced 48.9 grams of pigment for further testing.

B. The procedure of A is repeated except that the quantity of methacrylatochromic chloride solution is reduced to 5 grams to give 2% methacrylatochromic chloride based on the weight of the pigment used.

The pigments obtained in A and B are separately incorporated into a standard automotive-type acrylic lacquer formulation along with a maroon quinacridone pigment (solid solution of 40% quinacridonequinone/60% quinacridone) and sprayed on standard primed paint panels for testing in the Cleveland Humidity Cabinet (reference: Cleveland Society for Paint Technology Official Digest, Vol. 37, p. 490, 1965). In the control, the same nacreous pigment is used without methacrylatochromic chloride treatment. The results of these tests are given in Table I. The gloss test is according to ASTM–D 523.

TABLE I

| Sample | Pigment used in paint | Initial 20° gloss | 20° gloss after exposure | Drop in gloss, units |
|---|---|---|---|---|
| Control | 90% quinacridone pigment 10% nacreous pigment, untreated with chromic chloride complex. | 76 | 33 | −43 |
| I-A | 90% quinacridone pigment 10% nacreous pigment treated as in A. | 77 | 50 | −27 |
| I-B | 90% quinacridone pigment 10% nacreous pigment treated as in B. | 75 | 50 | −25 |

It will be seen from these results that the gloss diminishes to a greater extent in the control using an untreated nacreous pigment. The colore change for the control sample is also greater than that of the other two samples.

Example II

To 250 parts of a 20% solution in isopropanol of methacrylatochromic chloride is added 250 parts of water to produce a treating solution. A gold nacreous flake pigment of the type described in Example I is dispersed by stirring 2,502 parts of pigment into 8,964 parts of water, and the slurry heated to 45–50° C. by introducing steam directly into the slurry.

The treating solution is added to the heated pigment slurry as rapidly as it will run from the drums, this requiring about ten minutes. This is followed immediately with 46 parts of a 50% aqueous sodium hydroxide solution, and the solution held fifteen minutes before making a final pH adjustment. The pH of 5.8 is adjusted upwardly making three incremental additions totaling 12.7 parts of 50% sodium hydroxide solution to bring the pH in the range of 8.0–8.4, using in all 58.7 parts of 50% sodium hydroxide solution.

Two minutes after the final addition of caustic to pH 8.4, the pH drifts to 8.2 and the material is pumped to a plate and frame filter press. After filtrating is completed the material in the press is washed with water for 18 hours, then the press dumped and the product dried.

When the thusly treated material and the same base pigment but untreated (Control) gold base are separately dispersed in a thermoplastic acrylic vehicle using five parts pigment per hundred parts of vehicle solids, and the resulting paints tested in the Cleveland Humidity Cabinet as described above, the loss in gloss on exposure is as follows:

Units Gloss Loss on Exposure

Sample
Untreated Control _____ 72
Treated Pigment _____ 19

Example III

A nacreous pigment is again treated as described in Example I with the exception that the temperature during the treatment with methacrylatochromic chloride and during the subsequent one-hour stirring period is conducted at 27° C. at 50° C. and at 95° C., respectively, for three separate portions.

The pigments are tested as in Example I except that the quinacridone is omitted in the paint so that the nacreous material, at a 5% level based on the acrylic vehicle solids is the sole pigment. The following results are obtained:

Units Gloss Loss on Exposure

Sample:
Treatment at 27° C. _____ 49
Treatment at 50° C. _____ 63
Treatment at 95° C. _____ 72

What is claimed is:
1. A titania-coated micaceous pigment having absorbed on the surface thereof from about 0.05% to about 15%, based on the pigment weight of methacrylatochromic chloride.

2. A pigment according to Claim 1 wherein there is about 2% to about 6% based on the pigment of methacrylatochromic chloride.

3. Process for the production of a treated titania-coated micaceous pigment which will provide coating compositions of improved resistance to humidity whitening, said process comprising treating said pigment with about 0.05% to about 15%, based on the weight of the pigment, of methacrylatochromic chloride, said treatment being effected while pigment and methacrylatochromic chloride are maintained in an aqueous dispersion and at a temperature not in excess of about 60° C. to thereby cause absorption of the methacrylatochromic chloride onto the surface of the pigment particles.

4. Process according to Claim 3 wherein the amount of methacrylatochromic chloride so employed is about 2% to about 6% by weight, based on the pigment.

References Cited

UNITED STATES PATENTS

| 2,769,721 | 11/1956 | Frankl | 106—308 Q |
| 2,884,402 | 4/1959 | Bachmann et al. | 106—308 Q |
| 2,719,133 | 9/1955 | Smith | 260—29.7 |

CURTIS R. DAVIS, Primary Examiner